UNITED STATES PATENT OFFICE.

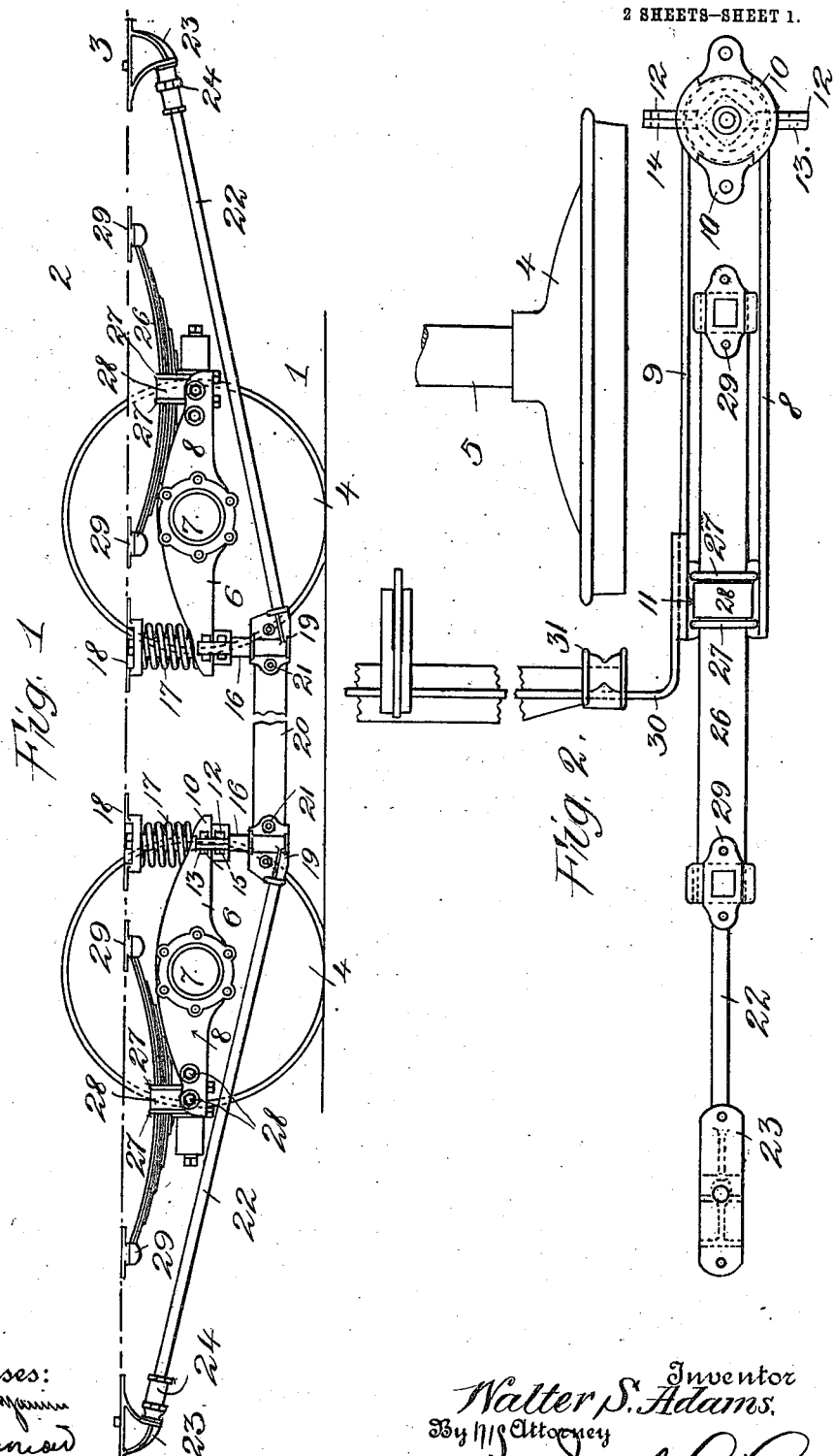

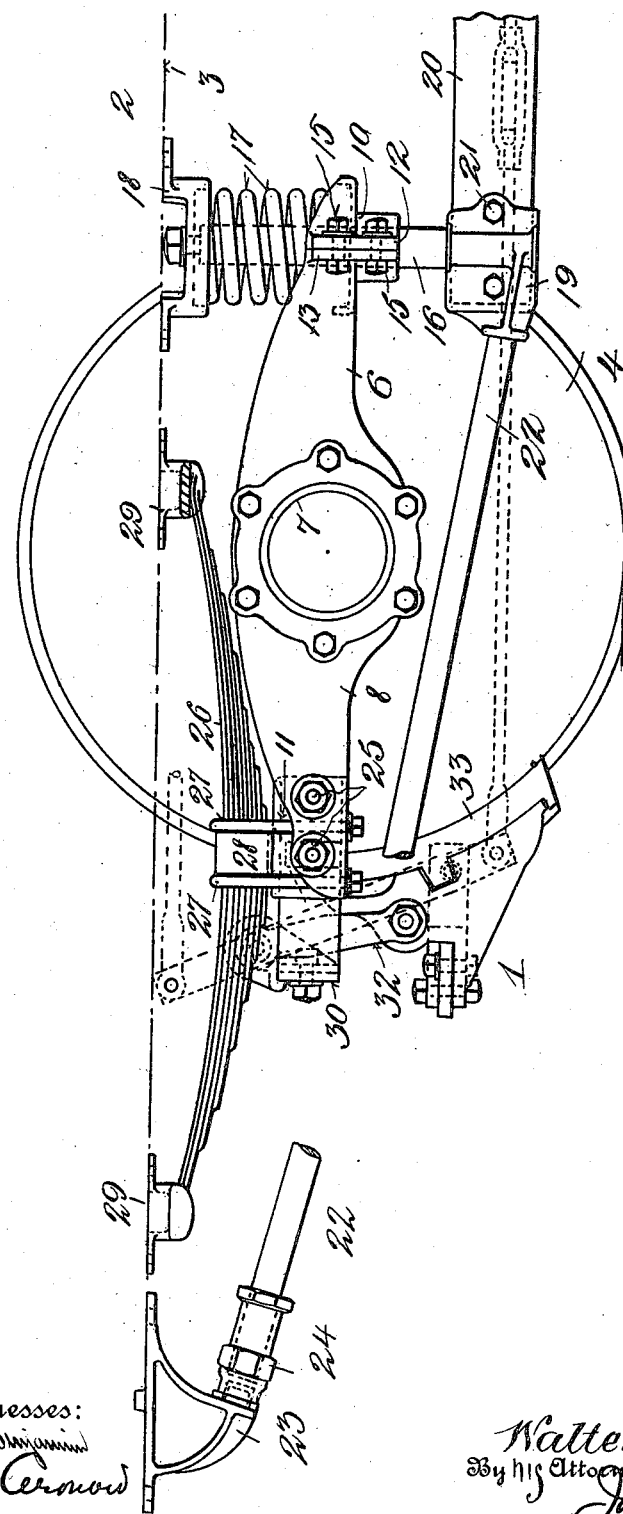

WALTER S. ADAMS, OF PHILADELPHIA, PENNSYLVANIA, ASSIGNOR TO THE J. G. BRILL COMPANY, OF PHILADELPHIA, PENNSYLVANIA, A CORPORATION OF PENNSYLVANIA.

CAR-TRUCK.

1,031,830.  Specification of Letters Patent.  Patented July 9, 1912.

Application filed August 31, 1911. Serial No. 647,004.

*To all whom it may concern:*

Be it known that I, WALTER S. ADAMS, a citizen of the United States, and a resident of the city of Philadelphia, county of Philadelphia, and State of Pennsylvania, have invented a new and useful Improvement in Car-Trucks, of which the following is a specification.

The object of my invention is to provide a truck which is especially adapted to cars carrying electric batteries and propelled by electric motors which are energized from the batteries. In trucks of this character, the structure must be light, rigid and strong. The car-body must be carried low enough to permit passengers to get on or off with ease, and without jar or vibration. The car truck, hereinafter described, embodying my invention, obtains all these results in a simple and satisfactory manner.

For a more particular description of my invention, reference is to be had to the accompanying drawings, forming a part hereof, in which—

Figure 1 is a side elevation of a truck embodying my invention. Fig. 2 is a plan view of a portion of the same some details being omitted. Fig. 3 is an enlarged side elevation of a portion of the structure shown in Fig. 1.

Throughout the various views of the drawings, similar reference characters designate similar parts.

My improved truck 1 is put under a car-body 2, or a structure, (such as a top-chord, not shown) but as lightness is desirable, it is preferable to omit the top chord and attach the truck 1 directly to the sills 3 of the car 2. The truck 1 has the usual wheels 4 mounted on suitable axles 5, in the conventional manner, and these axles 5 engage axle boxes 6 in any suitable way, as by roller, ball or friction bearings 7.

The axle boxes 6 are of novel form and consist of two parallel bars 8 and 9 respectively, the bar 8 being the outer, and these bars are connected at their ends by spring seats 10 and 11, and at their centers by the bearing 7. The bars 8 and 9 are preferably made and spaced substantially as shown, so that they will have a minimum weight and maximum strength and be sufficiently separated to avoid interfering with the springs that they carry.

The bearings 10 have laterally extending ears 12 which press against corresponding ears 13 and 14, which are integral with the bars 8 and 9 respectively, and the ears 12 are held in their respective places by bolts 15, which bind the ears 12 and 13 and 12 and 14 as shown. Each bearing 10 has a central perforation with a post 16 passing through the same, and slidably mounted thereon. A coiled spring 17 surrounds the upper portion of this post, and this spring 17 is surmounted by a suitable cap 18, that is adapted to be secured to a car body or top chord, as desired. The lower end of each post 16 is provided with a suitable casting or forging 19 shaped substantially as shown, and bolted on one side to bar 20 by suitable bolt 21, and on its other side it is secured to a truss-rod 22 in any suitable manner, and this truss-rod runs to a seat 23, which is also secured to the car body in the usual way. The truss-rod or rod 22 is provided with the usual nut 24, which will permit adjustment, so that the tension of the bar may be regulated, as desired. It will be noted that two bars 20 are employed, one on each side of the truck, and, if desired, the storage batteries may be supported from these bars. It will also be noted that by removing the bolts 15, the axle boxes 6 may be removed from under the car body when the same is jacked up, or otherwise suitably supported, so that access may be had to the motor or other parts, for either examination, repairs or renewals.

The outer ends of each axle box 6 have the bars 8 and 9 united by spring seats 11, as above set forth. These spring seats are held in position by bolts 25 or other suitable means or may be made integral with the axle box, and a leaf spring 26 is secured to the seat 11 by means of suitable bolts 27. Each spring is provided with a suitable band 28 of the conventional form. The free ends of the spring 26 engage suitable rub plates 29, which are attached to the car body 2 in the usual manner.

From the foregoing it is apparent that the car-body is carried from the axle boxes 6 by means of the springs 17 and 26, which are at some distance from their respective axles 5, and that in each case one spring is a leaf spring and the other is a coiled spring. As a leaf spring is more sluggish in its action than a coiled spring because of the friction of its members, one on another, all tendency of car-body to oscillate or vibrate in an undue manner is entirely eliminated. The use of a semi-elliptic spring 26, as shown, increases the length of the spring base and therefore increases the efficiency of the spring system of the truck one end of each spring 26 reaching out to near the end of the truck, and the other to a point over an axle.

The outer ends of the axle boxes 6 are united by a suitable crossing 30 secured near the seats 11, or in any other suitable manner. Each crossing 30 is provided with upwardly extending brackets 31, from which the brake rigging 32 is hung in the usual way. It will be noted that brake shoes 33 are outside the wheel base, and are hung so as to be supported without the intervention of a spring from the axle boxes. In other words, the brake shoes are hung substantially from the axle boxes, but this causes no undue rotation or oscillation of these axle boxes, because of the arrangement of the springs 17 and 26, above described.

While I have shown and described one embodiment of my invention, it is obvious that it is not restricted thereto, but is broad enough to cover all structures that come within the scope of the annexed claims.

Having thus described my invention, what I claim is:

1. In a device of the class described, an axle, car wheels mounted on said axle, axle boxes carried by said axle, and coiled and leaf springs carried directly from the said axle boxes.

2. A truck for cars comprising an axle, a pair of wheels, saddles journaled on the axle, spiral springs seated on the inner ends of the saddles, and a leaf-spring supported upon the outer ends of said saddles, the inner end of said spring extending over the saddles toward the axle boxes.

3. In a car-truck the combination of an axle and a pair of wheels, a pair of saddles journaled upon the axle, a spring-post extending through the inner end of the saddle, a spiral spring about the post, a leaf-spring supported upon the outer end of the saddle the inner end of which spring extends over the saddle, and a support for the lower end of said spring-post.

4. In a car truck, the combination of an axle and a pair of wheels, saddles journaled on the axles, cross-bars connecting the outer ends of said saddles, a leaf spring supported upon the outer ends of said saddles, its inner end extending over the saddles, and a spiral spring supported on the inner ends of said saddles.

5. In a car truck the combination of a pair of axles and wheels thereon, of saddles journaled on said axles having ends extending forwardly and rearwardly from said axles, spring posts passing through the inner ends of said saddles about which said ends may move, cross-bars connecting the front ends of said saddles together, upwardly arched leaf-springs secured to the outer ends of said saddles the inner ends of said springs extending over the saddles, a tie bar supporting and connecting the ends of said spring posts and a rod extending from the ends of said tie bar, and adapted to be secured to a car body.

6. In a device of the class described an axle box and means for supporting the same, said axle box being composed of two parallel bars united by a bearing and spring seats at each end of said bars, a leaf-spring mounted on one of said seats and a coil spring on the other.

7. In a truck of the class described, axles, axle-boxes supported thereby, and springs carried by the axle boxes, one of said springs being a semi-elliptic spring with one end substantially over an axle and the other extending toward the end of a car.

8. In a car truck the combination with axles, wheels, forwardly and rearwardly extending saddles supported on the axle, the rear end of the saddle having an apertured spring seat formed in sections, means for securing the sections together, a spring post passing through said aperture, a spring on said seat, a spring on the other end of the saddle, and means for combining the said springs and spring posts with a car-body.

9. In a device of the class described, axle-boxes and means for supporting the same, a leaf spring supported at the outer ends of each of said axle boxes and a coiled spring supported at the inner end of each of said axle boxes, a post extending through each of said coiled springs and bars uniting some of said posts.

10. In a device of the class described, axle boxes and means for supporting same, springs mounted at each end of each axle box, a post at one end of each axle box, parts uniting said posts, a car body carried by the springs on said axle boxes and a truss-rod uniting each post with the car body.

11. In a device of the class described, axle boxes adapted to support a car body, springs at each end of each axle box, a post at one end of each axle box, parts uniting said posts, crossings uniting the other ends of said axle boxes on opposite sides of the truck and a brake system suspended from said crossings.

Signed at the city of Philadelphia, county of Philadelphia, State of Pennsylvania, this 28" day of August, 1911.

WALTER S. ADAMS.

Witnesses:
JOHN H. OHLSSEN,
HARRY F. McKILLIP.